United States Patent Office 3,412,025
Patented Nov. 19, 1968

3,412,025
METHOD FOR SCALE AND CORROSION INHIBITION
Anton G. Ostroff, Dallas, Tex., assignor to Mobil Oil Corporation, a corporation of New York
No Drawing. Filed Sept. 22, 1965, Ser. No. 489,423
5 Claims. (Cl. 252—8.55)

ABSTRACT OF THE DISCLOSURE

A method for inhibiting the corrosion of metal surfaces, and the formation of scale thereon, which surfaces are in contact with an aqueous solution (sour brine water) that is normally corrosive and scale forming to such surfaces. A mixture of cocoamine condensed with a plurality of mols of ethylene oxide and a water-soluble glassy polyphosphate is added to the solution in a small effective amount to inhibit corrosion and scale-formation on the metal surfaces.

---

This invention relates to scale and corrosion inhibition in aqueous solutions which can produce scale and corrosion problems with metals. More particularly, it relates to a method for avoiding scale and corrosion problems with metals in contact with aqueous solutions, especially as with sour brine waters in oil fields.

Many aqueous solutions cause scale-formation and corrosion problems with the metals which these solutions contact. For example, oil field brines are aqueous solutions of various salts and dissolved gases. Certain brines may contain dissolved sodium, calcium, magnesium, bicarbonate, chloride, and sulfate ions, as well as gases like carbon dioxide and hydrogen sulfide. The concentration of these solutes determines the degree of scale formation and corrosivity of the aqueous solutions on the metals which contain them.

It is known that phosphates will help remedy scale formation and also that high molecular weight amines will help remedy the corrosion associated with aqueous solutions, especially oil field brines.

It has generally been found that the phosphates and amines acted separately in providing for scale and corrosion inhibition, respectively, and further, that no coaction existed between these inhibitors. Thus, a phosphate is added in a desired amount to inhibit scale formation without regard to the amine which is added in a desired amount to inhibit corrosion of metal surfaces contacted by aqueous solutions. This type of separate inhibiting action leaves much desired in the preventing of scale and corrosion problems which are associated with aqueous solutions.

It is therefore an object of this invention to provide a method for reducing scale and corrosion problems existing with aqueous solutions in contact with metal surfaces.

Another object is to provide a method which produces a coaction between certain mixed scale and corrosion inhibitors whereby one inhibitor enhances the effectiveness of the other.

Another object is to provide a method employing mixed scale and corrosion inhibitors which produces a greater inhibition in aqueous solution contacted metalic surfaces than the action of each inhibitor individually.

Another object is to provide a method employing mixed scale and corrosion inhibitors which produces an unexpected reduction in corrosion attack on exposed metal surfaces. These and further objects will become more clearly apparent from the following detailed description.

In accordance with this invention, there is provided a method for inhibiting the formation of scale and corrosive attack to metal surfaces exposed to aqueous solutions, which method employs the addition to such solution of a small amount of a mixture of an ethoxylated cocoamine and a water-soluble glassy polyphosphate.

One component of the mixture of this invention is the condensation product of a plurality of mols of ethylene oxide with cocoamine. Cocoamine may be generally represented by the formula $CH_3(CH_2)_{10}CH_2—NH_2$ and is prepared from monoethenoid fatty acids derived from coconuts. The "coco" group $C_{12}H_{25}—$ is not a group containing a specific number of carbon atoms, but is a number of individual groups containing different numbers of carbon atoms. However, the $C_{12}H_{25}—$ group is in greater amount than any other group.

The condensation product is formed by subjecting cocoamine to a condensation with a plurality of mols of ethylene oxide in a manner well known in the art. In general, the condensation product of a mol of cocoamine with between 2 and 15 mols of ethylene oxide may be employed with good results. Preferably, the condensation product is formed by condensing 10 mols of ethylene oxide per mol of cocoamine. Expressed on the basis of molecular weight, the ethoxylated cocoamine may have an average molecular weight between 285 and 860, but preferably, has an average molecular weight of about 645 for best results. The ethoxylated cocoamine is available commercially under the trade name "Ethomeens" from Armour and Company.

Only the ethoxylated cocoamine is known to produce the desired results in the present method.

Another component of the mixture of this invention is a water-soluble glassy polyphosphate, and it is to be understood that more than one of this type of polyphosphates may be used to produce useful results. This component may also be described as the water-soluble polyphosphate glasses or the so-called molecularly dehydrated phosphates. Of this group, perhaps the best known are the sodium metaphosphates, $NaPO_3$, or some multiple thereof such as $(NaPO_3)_3$, and these are known to exist in a large number of forms and varieties where the different glassy polyphosphates have varying ratios of $Na_2O$ to $P_2O_5$.

Examples of usable polyphosphates are sodium septaphosphate, tetrasodium pyrophosphate, sodium tetraphosphate, sodium tripolyphosphate, and sodium hexametaphosphate, with the latter two salts being preferred.

The usable polyphosphates of this group include the water-soluble salts of the alkali metals, alkaline earth metals, zinc and aluminum, either separately or in complexes; and in mixtures thereof of the polyphosphate compounds. Specific examples of these water-soluble salts of these polyphosphate compounds include sodium, calcium, magnesium, strontium, barium, zinc and aluminum, as the cation. In general, any of the water-soluble glassy polyphosphates used to inhibit scale formation in water systems may be used.

The mixture is intimately intermixed into the aqueous solution in small amounts, and the magnitude of such small amounts is dependent upon the severity of the scale and corrosion problems encountered. The mixture may be placed, premixed or each component separately, into the aqueous solution and by any suitable apparatus. In inhibiting some aqueous solutions as little as 1 p.p.m. (parts per million) will be sufficient; and in others, the mixture may be used in amounts of about 350 p.p.m. For example, in sour brine waters such as commonly encountered in oil fields, the ethoxylated cocoamine usually will be used in the range of between about 50 and 350 p.p.m. and the water-soluble glassy polyphosphate usually will be used in the range of between about 2 and 100 p.p.m. A mixture found especially useful to inhibit sour brine waters has a ratio between the mentioned phosphate and condensed amine of between about 5 to 75 and 5 to 100 p.p.m.

Laboratory tests of the aqueous solution to be inhibited may be made to determine the minimum amount of the mixture to be added just sufficient for adequate treatment.

The examples which follow will be further illustrative of the present invention.

An aqueous solution representative of oil field water was prepared from tap water by the addition of suitable amounts of salts and gases to provide a test solution having a concentration of 0.5 M NaCl, 0.01 M $Na_2CO_3$, 0.01 M $CaCl_2$ with approximately 100 p.p.m. $H_2S$. The test solution was saturated with carbon dioxide and held under a $CO_2$ pressure of 3 p.s.i.g. to prevent calcium carbonate from precipitating. The pH of the test solution was 6.5 initially and about 8.2 after scale formation occurred. The hydrogen sulfide concentration was 94 p.p.m. initially and about 83 p.p.m. at the end of the test procedure.

The test solution was circulated at 50° C. through a cell containing a corrosion specimen at a uniform flow rate for a six-hour period. At the conclusion of this period, the specimen and the scale formation were removed from the cell. The scale was water-washed, then dissolved in dilute hydrochloric acid. The amount of calcium carbonate was determined from the acid solution.

The corrosion specimen was an elongated piece of Type 1020 steel which was cleaned with alcohol, water, acetone, and absolute alcohol washes; dried; and then weighed. After recovery from the test cell, the same cleaning procedure was again practiced and the specimen reweighed.

The effectiveness of both scale and corrosion inhibitors, and their mixtures, in the tests was expressed as percent protection.

$$\text{Percent scaling protection} = 1.00 - \left[\frac{\text{wt. of scale}}{\text{wt. of scale}^1}\right] \times 100$$

$$\text{Percent corrosion protection} = 1.00 - \left[\frac{\text{corrosion loss MPY}}{\text{corrosion loss MPY}^1}\right] \times 100$$

where:

[1] is without inhibitors, and
MPY is mils per year.

In the following Table I are listed results of tests made in accordance with the described procedure:

TABLE I

| Component in Test Solution | Amount, p.p.m. | Protection | |
|---|---|---|---|
| | | Percent Scaling | Percent Corrosion |
| None | | 0 | 0 |
| Sodium tripolyphosphate | 5 | 100 | 0 |
| Sodium hexametaphosphate | 5 | 100 | 0 |
| Ethoxylated cocoamine [1] | 75–100 | 0 | 60 |
| Mixture A: | | | |
|   Sodium tripolyphosphate | 5 | 100 | 89 |
|   Ethoxylated cocoamine [1] | 75–100 | | |
| Mixture B: | | | |
|   Sodium hexametaphosphate | 5 | 100 | 89 |
|   Ethoxylated cocoamine [1] | 75–100 | | |
| Mixture C (by weight): | | | |
|   2.5% sodium tripolyphosphate | | | |
|   36.5% ethoxylated cocoamine [1] | 357 | 100 | 74 |
|   61.0% water (distilled) | | | |
| Mixture D (by weight): | | | |
|   2.5% sodium hexametaphosphate | | | |
|   36.5% ethoxylated cocoamine [1] | 357 | 100 | 78 |
|   61.0% water (distilled) | | | |
| Mixture E, sodium trimetaphosphate and ethoxylated cocoamine [1] (1:25) | 80 | 100 | 92 |

[1] Condensed with 10 mols of ethylene oxide.

The data in Table I conclusively points out the advantages in the present method of employing a mixture of a water-soluble glassy polyphosphate and ethoxylated cocoamine for reducing scale formation and corrosivity of aqueous solutions in contact with metals. Each of the mixtures A–E, inclusively, displays full protection against scaling and near-complete protection against corrosion attack.

Having thus described this invention, it will be understood that the present description is to be illustrative and not limitative of it, and that the scope of the invention may be found by reference to the appended claims.

What is claimed is:

1. A method of inhibiting the corrosion of metal surfaces and the formation of scale thereon in contact with an aqueous sour brine solution normally scale-forming and corrosive thereto which comprises dispersing in the solution a small amount sufficient to inhibit such corrosion and scale action of a mixture of cocoamine condensed with a plurality of mols of ethylene oxide to provide a condensation product having an average molecular weight between 285 and 860 and a water-soluble glassy polyphosphate.

2. The method of claim 1 wherein the cocoamine is condensed with between 2 and 15 mols of ethylene oxide and the glassy phosphate is a sodium metaphosphate.

3. The method of claim 1 wherein the condensation product of the cocoamine is present in the aqueous solution in an amount between about 50 and about 350 p.p.m. and the phosphate salt is present in an amount between about 2 and about 100 p.p.m.

4. The method of claim 1 wherein the polyphosphate salt is selected from the group consisting of sodium tripolyphosphate and sodium hexametaphosphate.

5. A method of inhibiting ferrous metal surfaces against corrosion attack and scale-formation thereon when in contact with sour brine water having dissolved ions of sodium, calcium, magnesium, bicarbonate, chloride, sulfate, and mixtures thereof, and dissolved acidic gases of carbon dioxide, hydrogen sulfide, and mixtures thereof, said water normally causing corrosion attack and scale-formation on exposed ferrous metals, the step comprising:

(a) dispersing in said sour brine water a mixture consisting essentially of (1) between 50 and 350 p.p.m. by weight of the condensation product of cocoamine adducted with between 2 and 15 mols of ethylene oxide for each mol of said cocoamine, and (2) between 2 and 100 p.p.m. by weight of a water-soluble glassy polyphosphate selected from the group consisting of the alkali metals, alkaline earth metals, zinc and aluminum, cations of polyphosphate salts, and mixtures of said polyphosphate salts.

References Cited

UNITED STATES PATENTS

| | | | |
|---|---|---|---|
| 2,592,511 | 4/1952 | Chittum | 252—8.55 |
| 2,658,036 | 11/1953 | Core et al. | 252—8.55 |
| 2,799,659 | 7/1957 | Mayhew et al. | 252—8.55 |
| 2,970,959 | 2/1961 | Jones | 252—181 X |
| 3,203,904 | 8/1965 | Brown | 252—392 |

FOREIGN PATENTS 661,881  4/1963  Canada.

OTHER REFERENCES

Ethofats, Ethomids and Ethomeens: Published 1954, by Armour and Co., Chicago, Ill., pp. 1 to 5.

HERBERT B. GUYNN, *Primary Examiner.*